US009620763B1

(12) United States Patent
Zeng et al.

(10) Patent No.: US 9,620,763 B1
(45) Date of Patent: Apr. 11, 2017

(54) CONNECTOR ASSEMBLY WITH INTEGRATED SENSE AND BALANCE LINE PROTECTION FOR MULTI-CELL BATTERIES

(71) Applicant: GS Yuasa Lithium Power, Inc, Roswell, GA (US)

(72) Inventors: QingHua Zeng, Duluth, GA (US); Wayne Kurle, Winston, GA (US); Thomas Deakin, Lilburn, GA (US); Brant Strickland, Duluth, GA (US)

(73) Assignee: GS Yuasa Lithium Power Inc., Roswell, GA (US)

( * ) Notice: Subject to any disclaimer, the term of this patent is extended or adjusted under 35 U.S.C. 154(b) by 0 days.

(21) Appl. No.: 15/063,266

(22) Filed: Mar. 7, 2016

(51) Int. Cl.
  *H01M 2/20* (2006.01)
(52) U.S. Cl.
  CPC ........ *H01M 2/206* (2013.01); *H01M 2220/20* (2013.01)
(58) Field of Classification Search
  CPC .... H01R 13/6658; H01R 13/68; H05K 3/308; Y02E 60/12; H01M 2/206
  USPC .................. 439/620.22, 620.24, 620.26, 627
  See application file for complete search history.

(56) References Cited

U.S. PATENT DOCUMENTS

| 6,152,776 | A  | * | 11/2000 | Ikeda  | H01M 2/1077 |
|           |    |   |         |        | 429/121     |
| 6,225,778 | B1 | * | 5/2001  | Hayama | H01M 2/1061 |
|           |    |   |         |        | 320/112     |
| 6,423,441 | B1 | * | 7/2002  | Ronning| H01M 2/202  |
|           |    |   |         |        | 361/748     |
| 7,547,233 | B2 | * | 6/2009  | Inoue  | H01G 2/04   |
|           |    |   |         |        | 361/328     |
| 8,313,855 | B2 | * | 11/2012 | Muis   | H01M 2/206  |
|           |    |   |         |        | 429/158     |
| 2009/0115631 | A1 | * | 5/2009 | Foote | B60Q 1/2665 |
|           |    |   |         |        | 340/901     |
| 2014/0293169 | A1 | * | 10/2014 | Uken | B60R 1/12   |
|           |    |   |         |        | 349/12      |
| 2014/0363711 | A1 |   | 12/2014 | Zhao |             |
| 2015/0222141 | A1 | * | 8/2015 | Yamazaki | H02J 7/025 |
|           |    |   |         |        | 320/103     |

OTHER PUBLICATIONS

"Guidelines", McKissock, Loyselle, and Vogel; *NASA Publication, Glenn Research Center; TM-2009-215751; Guidelines on Lithium-ion Battery Use in Space Applications;* Published May 2009.

* cited by examiner

*Primary Examiner* — Gary Paumen
(74) *Attorney, Agent, or Firm* — Philip H. Burrus, IV (57) ABSTRACT

A connector assembly (100,500) includes a plate (101,501) having a body (107,507) and one or more legs (108,109, 110,508,509,510) extending distally from the body. The body can define an aperture (112,512). A flexible substrate (102,502) can electrically couple to the legs such that a portion (202,602) of the body extends distally from an edge (203,603) of the flexible substrate. A connector (103,503) is electrically coupled to the flexible substrate, with one or more circuit components (104,105,504,505) electrically coupled between the legs and the connector. The flexible substrate can define a perimeter (201,601) that is complementary in shape to an upper surface (122,522) of a busbar connector (106,506).

20 Claims, 5 Drawing Sheets

CONNECTOR ASSEMBLY WITH INTEGRATED SENSE AND BALANCE LINE PROTECTION FOR MULTI-CELL BATTERIES

BACKGROUND

Technical Field

This disclosure relates generally to connectors, and more particularly to connectors for battery assemblies.

Background Art

For both manned and unmanned spacecraft, having reliable rechargeable batteries to provide power for the various computers and systems aboard the craft is imperative. Illustrating by example, reliable energy storage systems aboard satellites and other unmanned spacecraft can be the difference between system function and system failure. If the energy storage device aboard an orbiting satellite fails, the craft and the millions of dollars spent to launch it may become nothing more than sunk costs. For this reason, designers place extreme importance on appropriate design, testing, and hazard control of rechargeable batteries used in such environments.

The rechargeable battery systems used in these applications consist of many rechargeable battery cells connected together, generally in series, and if necessary also in parallel. One rechargeable cell, as with any electromechanical/electrochemical device, can operate slightly differently compared to another cell. Consequently, systems have been developed to allow spacecraft electronics to perform diagnostic and charge balancing operations via interconnections disposed between individual cells. The traditional interconnection is a simple wire or other electrical connector. Care must be taken when assembling the cells together, as it is easy to create a short circuit that can compromise the reliability of one or more cells, each of which can be quite expensive. Accordingly, one simple mistake by a technician in assembling an interconnection can cost a manufacturer many thousands of dollars in rechargeable cells that must be discarded. It would be advantageous to have improved interconnections for rechargeable battery assemblies.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A. Further, it is expected that one of ordinary skill, notwithstanding possibly significant effort and many design choices motivated by, for example, available time, current technology, and economic considerations, when guided by the concepts and principles disclosed herein will be readily capable of generating such connector assemblies, cell assemblies, and batteries with minimal experimentation.

Embodiments of the disclosure provide connector assemblies for use in multi-cell batteries that, advantageously, work to eliminate the possibility of a downstream fault, such as a short circuit, that may compromise the reliability of an interconnection between cells from over-current damage. For example, in one or more embodiments, a connector assembly includes current limiting resistors and fuses disposed along a flexible substrate coupled between cell terminals and interconnection components such as battery wiring harnesses, circuit substrate assemblies, or printed wiring boards, to prevent overcurrent damage that may compromise component reliability. Advantageously, in one or more embodiments, connector assemblies configured in accordance with embodiments of the disclosure can prevent inadvertent short circuits that may occur during battery assembly when rechargeable cells are coupled together.

In one or more embodiments, a connector assembly includes a plate having a body. While the body can be manufactured from various electrically conductive materials, in one or more embodiments the body is manufactured from nickel. In one or more embodiments, one or more legs extend distally from the body. In one or more embodiments, the body defining an aperture through which a cell terminal post may pass.

In one or more embodiments, a flexible substrate is then electrically coupled to the one or more legs. In one embodiment, the one or more legs can be soldered to the flexible substrate through a reflow process or other manufacturing process. In one embodiment, the flexible substrate is electrically coupled to the one or more legs such that a portion of the body extends distally from an edge of the flexible substrate, with the body and flexible substrate being non-overlapping components when viewed in the plan view.

In one embodiment, a connector is then electrically coupled to the flexible substrate. In one embodiment, the connector is a Low Insertion Force (LIF) connector that includes a socket into which a flexible connector can be coupled with very little insertion force. One or more spring contacts within the LIF connector then retain the flexible connector within the connector.

In one or more embodiments, one or more circuit components can then be electrically coupled between the one or more legs of the plate and the connector. Illustrating by example, in one embodiment one or more current limiting resistors and fuses can be coupled serially between the one or more legs and the connector. Accordingly, when the plate is coupled to the terminal post of a cell, and a flexible connector is inserted into the LIF connector, the current limiting resistors and/or fuse can limit current between the terminal post of the cell and anything that may be coupled to the flexible connector. Advantageously, this construction can reduce the risk of inadvertent short circuits that may occur during battery assembly when rechargeable cells are coupled together.

In one or more embodiments, the edge of the flexible substrate defines a concave recess that is axially aligned with the aperture of the plate such that the concave recess and the aperture are non-overlapping when the one or more legs are electrically coupled to the flexible substrate. In another embodiment, the flexible substrate defines a perimeter comprising at least four sides that are complementary in shape to a major face of a busbar connector of a multi-cell battery pack. Advantageously, by providing differently shaped flexible substrates for positive and negative terminal posts of a cell, the perimeter of the flexible substrate can define a mnemonic device indicating whether the connector assembly is to couple to a positive busbar connector or a negative busbar connector within a battery assembly.

Figure 1:
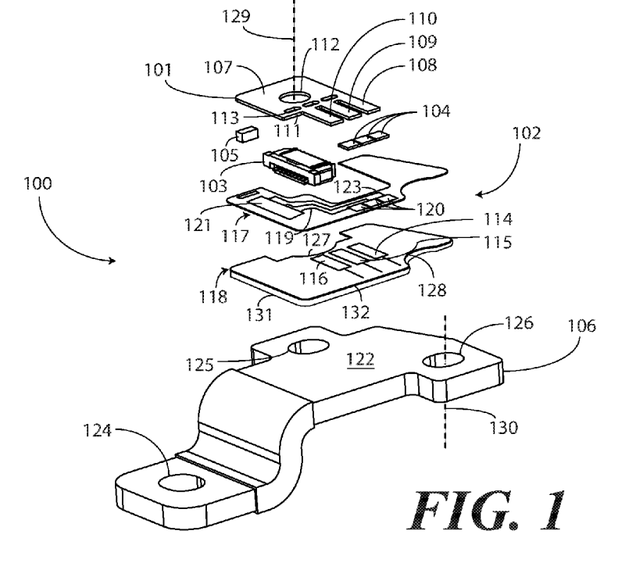
FIG. 1 illustrates an exploded view of one explanatory connector assembly in accordance with one or more embodiments of the disclosure.

Turning now to FIG. 1, illustrated therein is an exploded view of one embodiment of one connector assembly 100 configured in accordance with one or more embodiments of the disclosure. In one embodiment, the connector assembly 100 includes a plate 101, a flexible substrate 102, a connector 103, and one or more circuit components 104,105. In one embodiment, the connector assembly 100 is suitable for mechanically coupling to a busbar connector 106, with the plate 101 electrically coupling to the busbar connector 106.

In one embodiment, the plate 101 includes a body 107 and one or more legs 108,109,110. In one embodiment, the one or more legs 108,109,110 extend distally from a side edge 111 of the body 107. In this illustrative embodiment, the one or more legs 108,109,110 comprise three legs. However, the number of legs can vary based upon application. Fewer than three legs or more than three legs can extend from the body 107 as well.

In one or more embodiments, the plate 101 is manufactured from an electrically conductive material. For example, in one embodiment, the plate 101 is manufactured from nickel. This results in the plate 101 comprising a nickel plate. However, it will be obvious to those of ordinary skill in the art having the benefit of this disclosure that the plate 101 can be manufactured from other materials as well. Illustrating by example, in another embodiment the plate 101 can be manufactured from nickel-plated aluminum, nickel-plated copper, or other materials.

In one or more embodiments the body 107 of the plate 101 defines an aperture 112. In one embodiment, the aperture 112 is centrally disposed along the body 107 of the plate 101. In one embodiment, the aperture 112 is a circular aperture. However, the aperture 112 can take other shapes as well, including squares, hexagons, and so forth.

The body 107 of the plate 101 can define other features as well. In this illustrative embodiment, the body 107 defines one or more relief apertures 113. In one embodiment, the one or more relief apertures 113 are disposed between the aperture 112 and the one or more legs 108,109,110. As will be discussed in more detail below, in one or more embodiments the plate 101 is electrically coupled to the flexible substrate 102 by soldering the one or more legs 108,109,110 to electrically conductive pads 114,115,116 disposed along the flexible substrate 102. In one or more embodiments, the one or more relief apertures 113, which are optional, help to facilitate a more robust electrical connection between the one or more legs 108,109,110 and electrically conductive pads 114,115,116 when the one or more legs 108,109,110 are soldered to the electrically conductive pads 114,115,116 in a reflow soldering process. The relief apertures 113 are but one type of feature that can be included along the body 107 of the plate 101, as other features will be obvious to those of ordinary skill in the art having the benefit of this disclosure.

The flexible substrate 102 can include one or more layers. For example, in the illustrative embodiment of FIG. 1, the flexible substrate 102 comprises an upper layer 117 and a lower layer 118. When assembled, the upper layer 117 and the lower layer 118 are coupled together with conductive traces 119, vias, ground planes, or other electrically conductive elements disposed between the upper layer 117 and the lower layer 118.

In one or more embodiments, each of the upper layer 117 and the lower layer 118 can be manufactured from a flexible material, such as polyamide, upon which electrical traces 119 or electrically conductive pads 114,115,116,120,121 may be disposed. In one or more embodiments, each of the upper layer 117 and the lower layer 118 is manufactured from a flexible material so that it can be folded, flexed, bent, or otherwise manipulated so as to conform to the contours of the upper surface 122 of the busbar connector 106 when the connector assembly 100 is mechanically coupled to the busbar connector 106.

While flexible material is preferred, it will be obvious to those of ordinary skill in the art having the benefit of this disclosure that a rigid connector could be substituted for the flexible connector. For example, in another embodiment a circuit substrate manufactured from a rigid or semi-rigid material, such as FR4 fiberglass, can be used.

The electrical traces 119 traverse portions of the upper layer 117, the lower layer 118, or combinations thereof, to electrically couple the various components of the connector assembly 100 together. In one embodiment, the electrical traces 119 comprise copper traces disposed on or between the upper layer 117 and lower layer 118, respectively. Note that other materials may also be used for the electrical traces 119. For example, the electrical traces 119 may be any of copper, aluminum, or nickel. Other materials will be obvious to those of ordinary skill in the art having the benefit of this disclosure.

In this illustrative embodiment, the one or more legs 108,109,110 are electrically coupled to electrically conductive pads 114,115,116. In this illustrative embodiment, the electrically conductive pads 114,115,116 are disposed along the lower layer 118 of the flexible substrate 102. In this illustrative embodiment, the upper layer 117 of the flexible substrate defines a peninsular aperture 123 that exposes the electrically conductive pads 114,115,116 when the upper layer 117 and the lower layer 118 of the flexible substrate 102 are coupled together. In one embodiment, the peninsular aperture 123 defines a piecewise-linear concave recess to expose the one or more electrically conductive pads 114, 115,116 when the upper layer 117 and the lower layer 118 of the flexible substrate 102 are coupled together. In another embodiment, the upper layer 117 can define three apertures, each complementary in shape with the electrically conductive pads 114,115,116, to expose the electrically conductive pads 114,115,116 when the upper layer 117 and the lower layer 118 of the flexible substrate 102 are coupled together. Other techniques for exposing the electrically conductive pads 114,115,116 when the upper layer 117 and the lower layer 118 of the flexible substrate 102 are coupled together will be obvious to those of ordinary skill in the art having the benefit of this disclosure.

Figure 2:
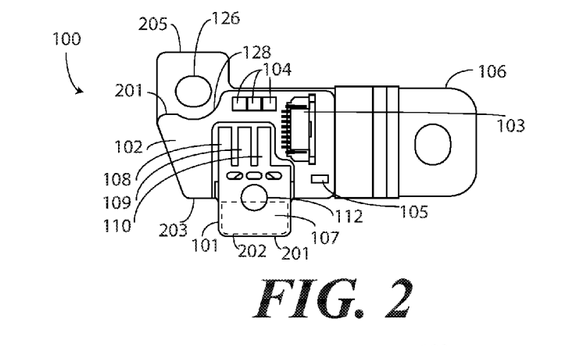
FIG. 2 illustrates a top plan view of one explanatory connector assembly in accordance with one or more embodiments of the disclosure.

In one or more embodiments, when the one or more legs 108,109,110 of the plate 101 are coupled to the electrically conductive pads 114,115,116, this occurs with a portion of the body extending distally from an edge of the flexible substrate 102. Turning briefly to FIG. 2, illustrated therein is the connector assembly 100 when mechanically attached to the busbar connector 106. As shown in this plan view, the flexible substrate 102 defines a perimeter 201, which defines the boundary edge of the flexible substrate 102. In this illustrative embodiment, a portion 202 of the plate 101 extends distally from an edge 203 defined by the perimeter 201 of the flexible substrate 102. Said differently, when viewed in the plan view of FIG. 2, the portion 202 of the plate 101, which in this case is a portion 202 of the body 107, and the flexible substrate 102 are non-overlapping.

Turning now back to FIG. 1, in this illustrative embodiment, the busbar connector 106 comprises a negative busbar connector that will be coupled to an anode terminal post of a rechargeable cell. In this illustrative embodiment, the busbar connector 106 defines one or more apertures 124, 125,126 with which electrical and/or mechanical connections to other components can be made. For example, in one embodiment a first aperture 124 can electrically and mechanically couple to an anode terminal post of a rechargeable cell. In one embodiment, a second aperture 125 can couple to the plate 101 of the connector assembly 100. A third aperture 126 can be used to couple the busbar connector 106 to other devices, such as relays, circuit breakers, or switches coupled between cells in a battery assembly. While three apertures 124,125,126 are shown for illustration in the busbar connector 106 of FIG. 1, it will be obvious to those of ordinary skill in the art having the benefit of this disclosure that embodiments are not so limited. The busbar connector 106 can have fewer or more apertures than three in other embodiments.

In one or more embodiments, the flexible substrate 102 defines one or more concave recesses. In this illustrative embodiment, the flexible substrate 102 defines a first concave recess 127 and a second concave recess 128. In this illustrative embodiment, the lower layer 118 of the flexible substrate 102 defines the first concave recess 127, while both the upper layer 117 and the lower layer 118 of the flexible substrate 102 define the second concave recess 128. Embodiments of the disclosure are not so limited, however. Where, for example, the upper layer 117 define three apertures instead of the peninsular aperture 123, with each aperture being complementary in shape with the electrically conductive pads 114,115,116 to expose the electrically conductive pads 114,115,116 when the upper layer 117 and the lower layer 118 of the flexible substrate 102 are coupled together, both the upper layer 117 and the lower layer 118 can define the first concave recess 127 as is the case with the second concave recess 128. Similarly, where either the upper layer 117 or the lower layer 118 has a different shape than the other, with one layer having a recess that turns more interior than the other, only one of the upper layer 117 or the lower layer 118 may define the second concave recess 128.

In the illustrative embodiment of FIG. 1, the edge (203) of the flexible substrate 102 defines the first concave recess 127. In this illustrative embodiment, the first concave recess 127 is axially aligned with the aperture 112 defined by the body 107 of the plate 101. Said differently, in this embodiment the radius defining the first concave recess 127 and the radius defining the aperture 112 in the body 107 each reference a common axis 129 that is centrally aligned with the aperture 112 of the body 107 of the plate 101.

In one or more embodiments, the radius defining the first concave recess 127 is greater than the radius defining the aperture 112 in the body 107. Where this is the case, the first concave recess 127 and the aperture 112 in the body 107 of the plate 101 are non-overlapping when the one or more legs 108,109,110 are electrically coupled to the electrically conductive pads 114,115,116 of the flexible substrate 102. Turning briefly back to FIG. 2, as shown in this plan view, the first concave recess (127) is not visible through the aperture 112 due to this non-overlapping construct that results from the fact that the radius defining the first concave recess (127) is greater than the radius defining the aperture 112 in the body 107.

Turning now back to FIG. 1, in this illustrative embodiment the flexible substrate 102 also includes the second concave recess 128. In this embodiment, the second concave recess 128 is disposed along a second edge 132 of the flexible substrate that is different from the edge (203) along which the first concave recess 127 is disposed. In one or more embodiments, the first concave recess 127 and the second concave recess 128 are defined by a common radius. Said differently, where an axis 129 is centrally aligned with aperture 125, and another axis 130 is centrally aligned with aperture 126, the radius extending from axis 129 to define the first concave recess 127 and the axis extending from the other axis 130 to define the second concave recess 128 can have the same length in one embodiment. In other embodiments, these radii can be different.

In one or more embodiments, the second concave recess 128 is axially aligned with aperture 126 of the busbar connector 106. Said differently, in this embodiment the radius defining the second concave recess 128 and the radius defining the aperture 126 in the busbar connector 106 each reference a common axis 130 that is centrally aligned with the aperture 126 of the busbar connector.

In one or more embodiments, the radius defining the second concave recess 128 is greater than the radius defining the aperture 126 in the busbar connector 106. Where this is the case, the second concave recess 128 and the aperture 126 in the busbar connector 106 are non-overlapping when the connector assembly 100 is coupled to the busbar connector 106. Turning briefly back to FIG. 2, as shown in this plan view, the second concave recess 128 is non-overlapping with aperture 126, due to the fact that the radius defining the second concave recess 128 is greater than the radius defining aperture 126.

Turning now back to FIG. 1, as noted above in one embodiment the connector assembly includes one or more circuit components 104,105. In one embodiment, the one or more circuit components 104,105 are coupled between the one or more legs 108,109,110 and the connector 103. In one embodiment, the one or more circuit components 104,105 function to limit an amount of current that can flow between anything electrically coupled to the plate 101 and the connector. Illustrating by example, in one embodiment circuit components 104 can comprise current limiting resistors. In one embodiment, the current limiting resistors can comprise one kilo-ohm resistors. It should be noted that this value is illustrative only, as other values may be more appropriate for other applications. In one embodiment, circuit component 105 can comprise a fuse. These one or more circuit components 104,105 can be interchanged, as fuses can be substituted for current limiting resistors and vice versa. Additionally, other components, such as inductors or capacitors can be used as the one or more circuit components 104,105 in other applications. Other one or more circuit components 104,105 will be obvious to those of ordinary skill in the art having the benefit of this disclosure. Advantageously, in one or more embodiments the one or more circuit components 104,105 function to prevent inadvertent short circuits that may occur during battery assembly when rechargeable cells are coupled together using the connector assembly 100.

In the illustrative embodiment of FIG. 1, the connector 103 is electrically coupled to an electrically conductive pad 121 disposed along the flexible substrate 102. In this illustrative embodiment, the connector 103 is coupled to an electrically conductive pad 121 disposed along the upper layer 117 of the flexible substrate 102. In one embodiment, as noted above, the connector 103 comprises LIF flex connector with a positive locking feature. The inclusion of the connector 103 allows a flexible connector, which may carry cell voltage sensing conductors and cell balancing conductors, to various cell components or other corresponding interfaces using either standard off-the-shelf flex ribbon cables or flex circuits designed specifically for the application.

In one embodiment, and optional adhesive layer 131 can be applied to a major face of the flexible substrate 102. For example, in this embodiment an adhesive layer 131 is applied to the lower major face of the lower layer 118 of the flexible substrate 102 so that the connector assembly 100 can adhesively adhere to an upper surface 122 of the busbar connector 106. In other embodiments, the optional adhesive layer 131 can be omitted.

Figure 3:
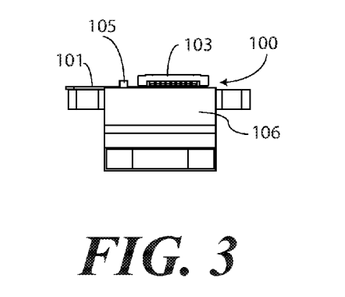
FIG. 3 illustrates an end elevation view of one explanatory connector assembly in accordance with one or more embodiments of the disclosure.
Figure 4:
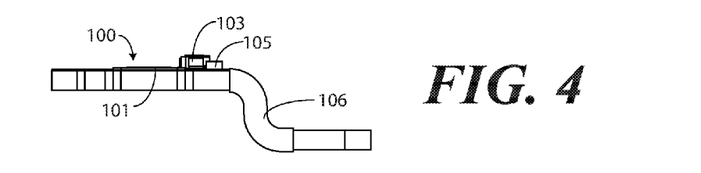
FIG. 4 illustrates a side elevation view of one explanatory connector assembly in accordance with one or more embodiments of the disclosure.

Turning now to FIGS. 2-4, illustrated therein is the connector assembly 100 disposed along an upper surface (122) of the busbar connector 106. As noted above, in one embodiment the connector assembly 100 includes an optional adhesive layer 131 disposed along the lower layer (118), on a side of the lower layer (118) that is opposite the upper layer (117). Accordingly, in one embodiment the connector assembly 100 is adhesively coupled to the upper surface (122) of the busbar connector 106. In other embodiments, the connector assembly 100 can be simply disposed along the upper surface (122) of the busbar connector 106, with the two being coupled together with a fastener as will be described in further detail below with reference to FIGS. 9-11.

As best shown in FIG. 2, in one embodiment the flexible substrate 102 defines a major face 204. Similarly, the busbar connector 106 can define a busbar major face along the upper surface (122). In one embodiment, the busbar major face has a greater area than the major face 204 of the flexible substrate 102. As a result, the flexible substrate 102 sits within a perimeter 205 of the busbar connector 106 defined by the busbar major face when the connector assembly 100 is coupled to the busbar connector 106. Said differently, in one embodiment the flexible substrate 102 sits fully within the perimeter 205 defined by the busbar major face as shown in FIG. 2.

The connector assembly 100, configured as shown in FIGS. 2-4, offers numerous advantages over prior art connectors. As an initial matter, the connector assembly 100 allows the connection of cell voltage sense and balance current lines to a stud-type terminal on a large format cell. Alternatively, the connector assembly 100 allows the connection of cell voltage sense and balance current lines to a bolted connection on a connecting major current carrying element, such as a busbar or cell bypass switch. This will be described in further detail with reference to FIGS. 9-11 below.

The connector assembly 100 offers other advantages as well. Illustrating by example, where the circuit components 104,105 comprise current limiting resistors and fuses, each of these circuit components 104,105 can be located in close proximity with a cell terminal post. These circuit components 104,105 provide protection for all connecting conductors against downstream faults. This protection cannot be achieved with protective elements located remotely with respect to the cell terminal post.

Additionally, where the plate 101 is manufactured from nickel, the nickel plate and its multiple connections occurring via the one or more legs 108,109,110 to the flexible substrate 102 function such that only the nickel plate is mechanically and electrically coupled to a cell terminal post. This configuration avoids the possibility of elastomeric materials, such as those forming the flexible substrate 102, being under compression in a bolted cell terminal post connection. This also prevents creep phenomena from resulting in a loose (and potentially high resistance) cell terminal post connection, which in turn can result in overheating of the cell.

Moreover, the use of the connector 103 allows for multiple independent connections to the cell in a small area with a lightweight solution. Prior art solutions such as metal rings with wires crimped thereto cannot offer this advantageous feature. Additionally, where the connector 103 is a LIF connector with a positive locking feature. This provides a means of connecting the cell sense and balance lines to any battery electronics or host interface using either standard off-the-shelf flex ribbon cables or flex circuits designed specifically for the application.

Another advantageous feature of the connector assembly 100 is that with the exception of the conductive surfaces of the plate 101, the remainder of the components of the connector assembly 100 are disposed along fully insulated surfaces of the flexible substrate 102. This significantly reduces the risk of shorting to adjacent cell terminal posts and busbars or busbar connectors during battery assembly processes.

Other advantages include the fact that the use of the plate 101 allows thermal sensing elements like thermistors to be coupled directly to the plate 101. This ensures that the temperature sensing component can be located as closely to the connection point of the cell as possible, thereby most accurately sensing internal cell temperature. The connector assembly 100 also allows for modular assembly of batteries with different numbers of cells.

Figure 5:
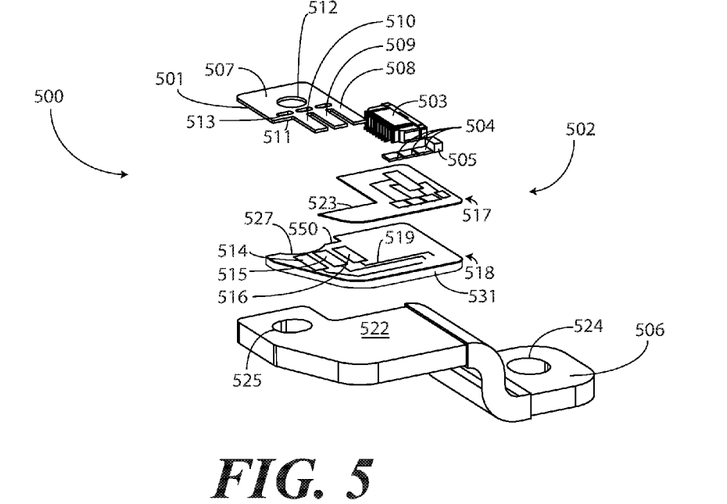
FIG. 5 illustrates an exploded view of another explanatory connector assembly in accordance with one or more embodiments of the disclosure.

Turning now to FIG. 5, illustrated therein is another connector assembly 500 configured in accordance with one or more embodiments of the disclosure. While the connector assembly (100) of FIGS. 1-4 was configured for connection to a negative cell terminal post, in one embodiment the connector assembly 500 of FIG. 5 is configured to couple to a positive cell terminal post.

The connector assembly 500 of FIG. 5 includes many of the same components as the connector assembly (100) of FIGS. 1-4. Illustrating by example, the connector assembly 500 includes a plate 501, a flexible substrate 502, a connector 503, and one or more circuit components 504,505. In one embodiment, the connector assembly 500 is suitable for mechanically coupling to a busbar connector 506, with the plate 501 electrically coupling to the busbar connector 506.

The connector assembly 500 of FIG. 5 differs from the connector assembly (100) of FIGS. 1-4 in the shape, layout, and design of the flexible substrate. Additionally, the busbar connector 506 of FIG. 5 differs in shape and design from the busbar connector (106) of FIGS. 1-4.

As with the embodiment of FIGS. 1-4, the plate 501 of FIG. 5 includes a body 507 and one or more legs 508,509, 510. In one embodiment, the one or more legs 508,509,510 extend distally from a side edge 511 of the body 507. In this illustrative embodiment, the one or more legs 508,509,510 comprise three legs. However, the number of legs can vary based upon application. Fewer than three legs or more than three legs can extend from the body 507 as well.

In one or more embodiments, the plate 501 is manufactured from an electrically conductive material such as nickel. The plate 101 can be manufactured from other materials as well, including copper, aluminum, nickel-plated copper, or other materials. In one or more embodiments the body 507 of the plate 501 defines an aperture 512. In one embodiment, the aperture 112 is centrally disposed along the body 507 of the plate 501. The aperture 112 can take different shapes. The body 507 of the plate 501 can define other features as well, such as one or more relief apertures 513. The relief apertures 513 are but one type of feature that can be included along the body 507 of the plate 501, as other features will be obvious to those of ordinary skill in the art having the benefit of this disclosure.

The flexible substrate 502 can include one or more layers, such as the upper layer 517 and lower layer 518 shown in FIG. 5. When assembled, the layers are coupled together with conductive traces 519 disposed between or along the layers. The layers can be manufactured from a flexible material, such as polyamide, upon which electrical traces 519 or electrically conductive pads may be disposed. While flexible material is preferred, it will be obvious to those of ordinary skill in the art having the benefit of this disclosure that a rigid connector could be substituted for the flexible connector. For example, in another embodiment a circuit substrate manufactured from a rigid or semi-rigid material, such as FR4 fiberglass, can be used.

In this illustrative embodiment, the one or more legs 508,509,510 are electrically coupled to electrically conductive pads 514,515,516, each of which is disposed along the lower layer 518 of the flexible substrate 502. In this illustrative embodiment, the upper layer 517 of the flexible substrate defines an orthogonally concave aperture 523 that exposes the electrically conductive pads 514,515,516 when the upper layer 517 and the lower layer 118 of the flexible substrate 502 are coupled together. In one embodiment, the orthogonally concave aperture 523 defines a piecewise-linear concave recess to expose the one or more electrically conductive pads 514,515,516 when the upper layer 517 and the lower layer 518 of the flexible substrate 502 are coupled together. In another embodiment, the upper layer 517 can define three apertures, each complementary in shape with the electrically conductive pads 514,515,516, to expose the electrically conductive pads 514,515,516 when the upper layer 517 and the lower layer 518 of the flexible substrate 502 are coupled together. Other techniques for exposing the electrically conductive pads 514,515,516 when the upper layer 517 and the lower layer 518 of the flexible substrate 502 are coupled together will be obvious to those of ordinary skill in the art having the benefit of this disclosure.

Figure 6:
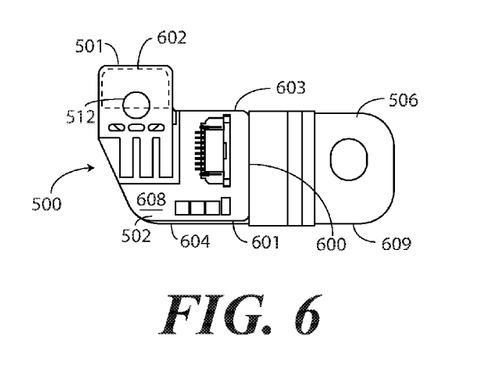
FIG. 6 illustrates a top plan view of one explanatory connector assembly in accordance with one or more embodiments of the disclosure.

In one or more embodiments, as with the connector assembly (100) of FIGS. 1-4, when the one or more legs 508,509,510 of the plate 501 are coupled to the electrically conductive pads 514,515,516, this occurs with a portion of the body extending distally from an edge of the flexible substrate 502. Turning briefly to FIG. 6, illustrated therein is the connector assembly 500 when mechanically attached to the busbar connector 506. As shown in this plan view, the flexible substrate 502 defines a perimeter 601. The perimeter 601 of this illustrative embodiment is a truncated-corner rectangular shape, where a corner of the rectangle is truncated by converting an orthogonal angle into two obtuse angles. It will be clear to those of ordinary skill in the art having the benefit of this disclosure, however, that the invention is not so limited. Other shapes for the perimeter 601, including rectangles, ovals, triangle-rectangle combinations, and so forth, may also be used. Generally speaking, the shape of the flexible substrate 502 will be influenced by the physical geometry of the cell cathode-anode form factor. In this illustrative embodiment, a portion 602 of the plate 501 extends distally from an edge 603 defined by the perimeter 601 of the flexible substrate 502.

Turning now back to FIG. 5, in this illustrative embodiment, the busbar connector 506 comprises a positive busbar connector that will be coupled to a cathode terminal post of a rechargeable cell. In this illustrative embodiment, the busbar connector 506 defines one or more apertures 524,525 with which electrical and/or mechanical connections to other components can be made. In one embodiment, the positive busbar connector comprises fewer apertures 542,525 than does the negative busbar connector of FIGS. 1-4.

In one embodiment, a first aperture 524 can electrically and mechanically couple to a cathode terminal post of a rechargeable cell. In one embodiment, a second aperture 525 can couple to the plate 501 of the connector assembly 500. The second aperture 525 can also be used to couple the busbar connector 506 to other devices, such as relays, circuit breakers, or switches coupled between cells in a battery assembly.

In one or more embodiments, the flexible substrate 502 defines a single concave recess 527. In the illustrative embodiment of FIG. 5, an edge 550 of the flexible substrate 502 defines the single concave recess 527. In this illustrative embodiment, the single concave recess 527 is axially aligned with the aperture 512 defined by the body 507 of the plate 501. The single concave recess 527 is also axially aligned with aperture 525 of the busbar connector 506. In one or more embodiments, the radius defining the single concave recess 527 is greater than the radius defining the aperture 512 in the body 507. Where this is the case, the single concave recess 527 and the aperture 512 in the body 507 of the plate 501 are non-overlapping when the one or more legs 508,509,510 are electrically coupled to the electrically conductive pads 514,515,516 of the flexible substrate 502, as shown in FIG. 6 where the single concave recess (527) is not visible through the aperture 512.

Turning now back to FIG. 1, in one embodiment the connector assembly includes one or more circuit components 504,505. In one embodiment, the one or more circuit components 504,505 are coupled between the one or more legs 508,509,510 and the connector 503. In one embodiment, the one or more circuit components 504,505 function to limit an amount of current that can flow between anything electrically coupled to the plate 501 and the connector. Illustrating by example, in one embodiment circuit components 504 can comprise current limiting resistors, while circuit component 505 comprises a fuse. These one or more circuit components 504,505 can be interchanged, as noted above.

In the illustrative embodiment of FIG. 5, the connector 503 is electrically coupled to the one or more circuit components 504,505. The connector 503 allows a flexible connector, which may carry cell voltage sensing conductors and cell balancing conductors, to various cell components or other corresponding interfaces using either standard off-the-shelf flex ribbon cables or flex circuits designed specifically for the application.

In one embodiment, and optional adhesive layer 531 can be applied to a major face of the flexible substrate 502. For example, in this embodiment an adhesive layer 531 is applied to the lower major face of the lower layer 518 of the flexible substrate 502 so that the connector assembly 500 can adhesively adhere to an upper surface 522 of the busbar connector 506. In other embodiments, the optional adhesive layer 531 can be omitted.

As best shown in FIG. 6, in this illustrative embodiment the perimeter 601 of the flexible substrate 502 comprises at least four sides 604,605,606,607. In one embodiment, the four sides 604,605,606,607 are complementary in shape to the major face defined by the upper surface (522) of the busbar connector 506, which in one embodiment is a busbar connector 506 of a multi-cell battery pack. As this perimeter 601 is quite distinct from the perimeter (201) of the connector assembly (100) of FIGS. 1-4, in one embodiment each perimeter 601,(201) can function as a mnemonic device indicating whether the connector assembly 500,(100) is to couple to a positive busbar connector or a negative busbar connector.

Illustrating by example, the truncated corner rectangular shape provides a technician with an easily identifiable perimitrically defined mnemonic indicating that the connector assembly 500 should couple to the positive busbar connector and not the negative busbar connector. The corollary applies for the connector assembly (100) of FIGS. 1-4. In the latter embodiment, rather than the truncated corner rectangular shape, the concave curved recess (128) disposed along the second edge (132) of the flexible substrate (102), which is different from the edge (203) along which the first concave recess (127) is disposed, can define the mnemonic device indicating that the connector assembly (100) should couple to the negative busbar connector.

Figure 7:
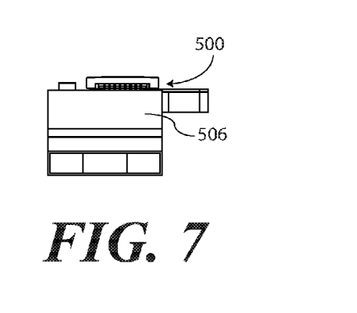
FIG. 7 illustrates an end elevation view of one explanatory connector assembly in accordance with one or more embodiments of the disclosure.
Figure 8:
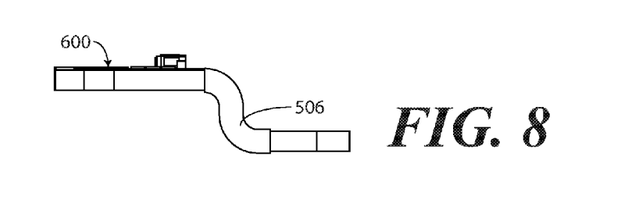
FIG. 8 illustrates a side elevation view of one explanatory connector assembly in accordance with one or more embodiments of the disclosure.

Turning now to FIGS. 6-8, illustrated therein is the connector assembly 500 disposed along an upper surface (522) of the busbar connector 506. As noted above, in one embodiment the connector assembly 500 includes an optional adhesive layer (531) disposed along the lower layer (518). Accordingly, in one embodiment the connector assembly 500 is adhesively coupled to the upper surface (522) of the busbar connector 506. In other embodiments, the connector assembly 500 can be simply disposed along the upper surface (522) of the busbar connector 506, with the two being coupled together with a fastener.

As with the embodiment of FIG. 2, in FIG. 5 the flexible substrate 502 defines a major face 608. Similarly, the busbar connector 506 can define a busbar major face along the upper surface (522). In one embodiment, the busbar major face has a greater area than the major face 608 of the flexible substrate 502. As a result, the flexible substrate 502 sits within a perimeter 609 of the busbar connector 506 defined by the busbar major face when the connector assembly 500 is coupled to the busbar connector 506.

Figure 9:
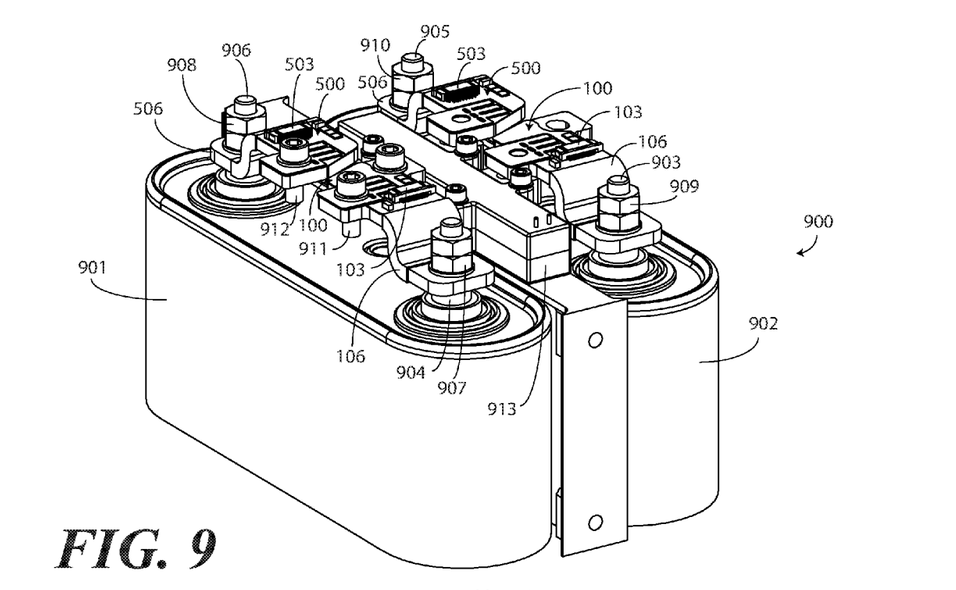
FIG. 9 illustrates one partial view of one explanatory cell assembly in accordance with one or more embodiments of the disclosure.
Figure 10:
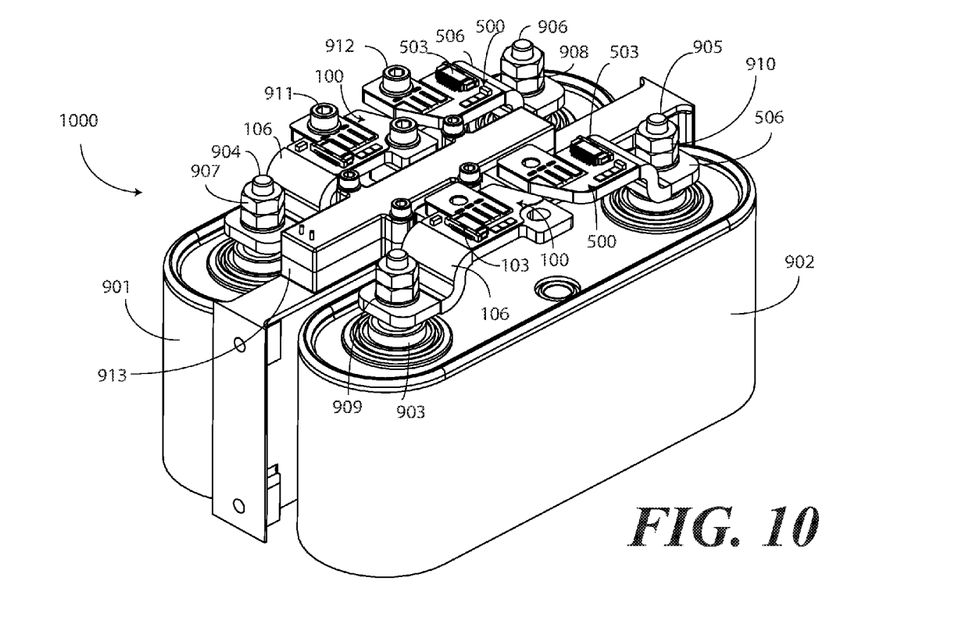
FIG. 10 illustrates another partial view of one explanatory cell assembly in accordance with one or more embodiments of the disclosure.
Figure 11:
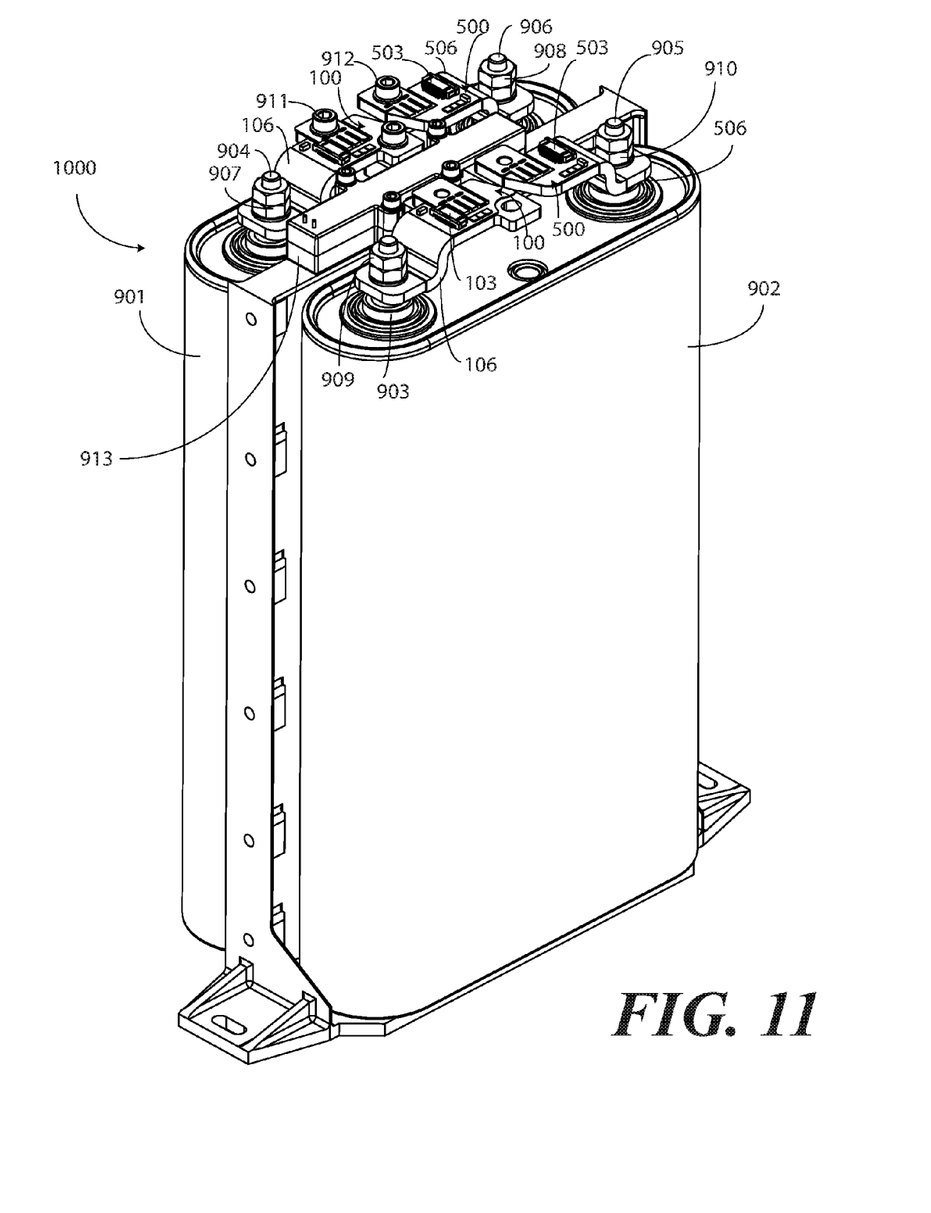
FIG. 11 illustrates a perspective view of one explanatory cell assembly in accordance with one or more embodiments of the disclosure.

Turning now to FIGS. 9-11, illustrated therein are two partial perspective views 900,1000 and a full perspective view 1100 of a cell assembly employing the connector assembly 100 of FIGS. 1-4 and the connector assembly 500 of FIGS. 5-8. The illustrative cell assembly includes a first cell 901 and a second cell 902, each having a negative terminal post 903,904 and a positive terminal post 905,906. In one or more embodiments, each of the negative terminal post 903,904 and the positive terminal post 905,906 are threaded.

In one or more embodiments, one or more fasteners 907,908,909,910 are coupled to the negative terminal posts 903,904 and the positive terminal posts 905,906 to retain the corresponding busbar connectors 106,506 to each negative terminal post 903,904 and positive terminal post 905,906, respectively. In this illustrative embodiment, the one or more fasteners 907,908,909,910 each comprise nuts.

In one or more embodiments, another fastener 911,912 passing through the aperture (112,512) of each plate (101, 501) and the corresponding busbar connector 106,506 aperture (125,525) to couple the connector assembly 100,500 to the corresponding busbar connector 106,506. In this illustrative embodiment, these fasteners 911,912 comprise threaded bolts, which may optionally be coupled to corresponding nuts. In other embodiments, each busbar connector 106,506 aperture (125,525) can comprise a threaded aperture into which the threaded bolts may couple. Other types of fasteners 911,912 suitable for coupling the connector assembly 100,500 to the corresponding busbar connector 106,506 will be obvious to those of ordinary skill in the art having the benefit of this disclosure.

Figure 12:
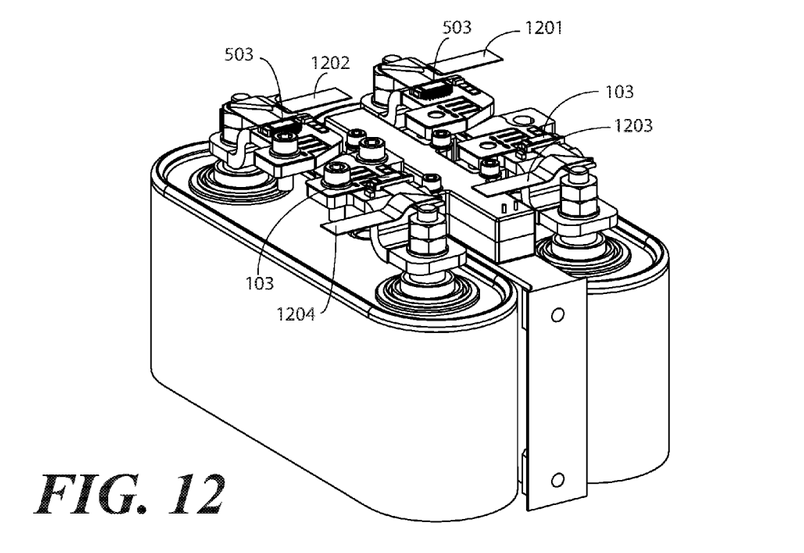
FIG. 12 illustrates one partial view of another explanatory cell assembly in accordance with one or more embodiments of the disclosure.
Figure 13:
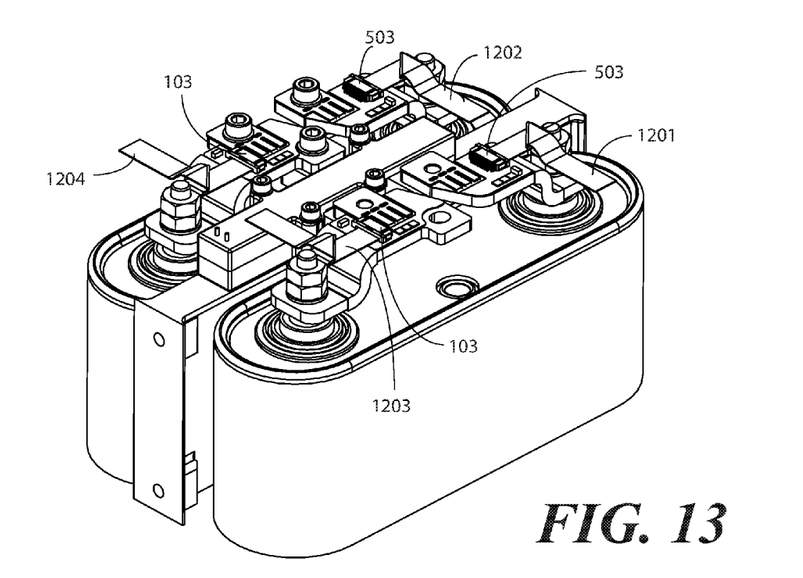
FIG. 13 illustrates another partial view of another explanatory cell assembly in accordance with one or more embodiments of the disclosure.

The busbar connectors 106,506 can then optionally couple to other components as well. Illustrating by example, in each cell assembly, a switch 913 can couple to one or both busbar connector 106,506. Where ribbon cables are inserted into the connectors 103,503, and those ribbon cables are used to sense voltage or other parameters, the switch 913 can be used to take cell 901 off line when those voltage or other parameters exceed predefined operating thresholds. Turning briefly to FIGS. 12-13, such ribbon cables 1201,1202,1203, 1204 are shown inserted into the connectors 103,503 for this purpose. Signals traversing the ribbon cables 1201,1202, 1203,1204 can be used for other functions as well, as will be obvious to those of ordinary skill in the art having the benefit of this disclosure.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A connector assembly, comprising:
   a plate having a body and one or more legs extending distally from the body, the body defining an aperture;
   a flexible substrate electrically coupled to the one or more legs such that a portion of the body extends distally from an edge of the flexible substrate;
   a connector electrically coupled to the flexible substrate; and
   one or more circuit components electrically coupled between the one or more legs and the connector;
   wherein the edge of the flexible substrate defines a concave recess that is axially aligned with the aperture such that the concave recess and the aperture are non-overlapping when the one or more legs are electrically coupled to the flexible substrate.

2. The connector assembly of claim 1, the plate comprising a nickel plate.

3. The connector assembly of claim 2, the plate defining one or more relief apertures disposed between the aperture and the one or more legs.

4. The connector assembly of claim 3, the one or more legs comprising three legs.

5. The connector assembly of claim 1, the flexible substrate defining a second concave recess disposed along a second edge.

6. The connector assembly of claim 5, the concave recess and the second concave recess comprising a common radius.

7. The connector assembly of claim 1, further comprising:
   a busbar connector defining a first busbar connector aperture; and
   a fastener;
   the fastener passing through the aperture and the first busbar connector aperture to couple the connector assembly to the busbar connector.

8. The connector assembly of claim 7, the flexible substrate defining a major face, the busbar connector comprising a busbar major face having a greater area than the major face.

9. The connector assembly of claim 8, the busbar major face defined by a perimeter, the flexible substrate disposed interior to the perimeter when the connector assembly is coupled to the busbar connector.

10. The connector assembly of claim 9, the busbar connector defining a second busbar connector aperture, the flexible substrate defining a second concave recess disposed along a second edge, wherein the second concave recess is axially aligned with the second busbar connector aperture such that the second concave recess and the second busbar connector aperture are non-overlapping when the connector assembly is coupled to the busbar connector.

11. The connector assembly of claim 1, the flexible substrate comprising:
    an upper layer and a lower layer; and
    one or more electrically conductive pads disposed along the lower layer to electrically couple to the one or more legs;
    wherein the upper layer defines a piecewise-linear concave recess to expose the one or more electrically conductive pads when the upper layer and the lower layer are coupled together.

12. The connector assembly of claim 11, further comprising an adhesive layer disposed along the lower layer on a side of the lower layer opposite the upper layer.

13. The connector assembly of claim 12, the one or more circuit components comprising one or more of fuses or resistors.

14. The connector assembly of claim 13, the connector comprising a low-insertion force (ZIF) connector.

15. A connector assembly, comprising:
    a plate defining an aperture and comprising one or more legs extending from a plate edge;
    a flexible substrate comprising one or more pads to electrically couple to the one or more legs, respectively;
    a connector, coupled to the flexible substrate; and
    one or more circuit components electrically coupled between the one or more legs and the connector;
    the plate extending distally from a flexible substrate edge; and
    the flexible substrate defining a perimeter comprising at least four sides that are complementary in shape to a major face of a busbar connector of a multi-cell battery pack.

16. The connector assembly of claim 15, further comprising the busbar connector, wherein the flexible substrate is disposed along the major face.

17. The connector assembly of claim 16, further comprising an adhesive layer disposed along the flexible substrate to couple the flexible substrate to the major face.

18. The connector assembly of claim 16, the busbar connector defining a busbar connector aperture, further comprising a fastener passing through the aperture and the busbar connector aperture to couple the connector assembly to the busbar connector.

19. The connector of claim 15, the perimeter defining a mnemonic device indicating whether the connector assembly is to couple to a positive busbar connector or a negative busbar connector.

20. The connector of claim 19, the mnemonic device defined by a concave recess disposed along another flexible substrate edge different from the flexible substrate edge.

* * * * *